United States Patent

Lohman et al.

[11] Patent Number: 5,097,719
[45] Date of Patent: Mar. 24, 1992

[54] DEVICE FOR BICYCLES

[76] Inventors: Oskar R. Lohman, Smedjevägen 16, S-131 33 Nacka, Sweden;

[21] Appl. No.: 678,959
[22] PCT Filed: Sep. 29, 1989
[86] PCT No.: PCR/SE89/00530
§ 371 Date: Apr. 19, 1991
§ 102(e) Date: Apr. 19, 1991
[87] PCT Pub. No.: WO90/03305
PCT Pub. Date: Apr. 5, 1990

[30] Foreign Application Priority Data

Sep. 29, 1988 [SE] Sweden ............... 88034566

[51] Int. Cl.⁵ ............ B62M 25/04; B62K 23/06
[52] U.S. Cl. ..................... 74/502.2; 192/64
[58] Field of Search ............ 74/502.2; 192/64

[56] References Cited

U.S. PATENT DOCUMENTS

| | | | |
|---|---|---|---|
| 4,102,215 | 7/1978 | Nagano et al. | 192/64 X |
| 4,532,825 | 8/1985 | Nagano | 74/502.2 X |
| 4,674,617 | 6/1987 | Nagano | 192/64 X |
| 4,913,500 | 4/1990 | Wauke et al. | 192/64 X |
| 4,995,280 | 2/1991 | Tagawa | 74/502.2 X |
| 5,012,692 | 5/1991 | Nagano | 74/502.2 X |

FOREIGN PATENT DOCUMENTS

| | | | |
|---|---|---|---|
| 352732 | 1/1990 | European Pat. Off. | 74/502.2 |
| 3916919 | 11/1989 | Fed. Rep. of Germany | 74/502.2 |
| 478734 | 3/1953 | Italy | 74/502.2 |
| 602711 | 6/1948 | United Kingdom | 74/502.2 |

Primary Examiner—Dwight Diehl
Attorney, Agent, or Firm—Beveridge, DeGrandi & Weilacher

[57] ABSTRACT

A device for a bicycle comprising a drive transmission which is coupled to the drive wheel of the bicycle and includes a gear change mechanism with a number of different size chain sprockets, a shifting device coupled to the gear change mechanism and a freewheel coupling arranged between the drive wheel and the chain sprockets. Moreover, the device comprises a disengage mechanism (34-37) which is coupled to the shifting device (20) of the gear change device by means of a friction element (19) and a drive member (23) for enabling simultaneous disengagement of the freewheel coupling and change of gear.

5 Claims, 5 Drawing Sheets

DEVICE FOR BICYCLES

This invention relates to a device for bicycles, which comprises a drive transmission which is coupled to the drive wheel of the bicycle and includes a gear change mechanism with a number of different size chain sprockets, a shifting means coupled to the gear change mechanism, and a free wheel coupling arranged between the drive wheel and the chain sprockets.

Previous chain gear change mechanisms at bicycles of the above type are disadvantageous in that the drive wheel and the chain sprockets have the same rotation speed at propulsion of the bicycle, which means that when changing from one chain sprocket to another, the drive wheel has to rotate basically a full revolution before the new gear is able to transfer a drive load for propulsion of the bicycle without unnecessary wear of the chain and the chain sprocket. At worst, the chain may jump off the actual chain sprocket. This is evident to everyone who has tried to change gear when going uphill or when the bicycle is stopped at a traffic light with a high gear engaged. Since it takes a lot of effort to get started on a high gear, it is desirable to shift down to a lower gear before starting.

This and other drawbacks are avoided by the invention in that a device according to the invention enables disangagement of the freewheel coupling of the drive wheel at gear changing, which makes it possible to shift gear with the bicycle at standstill and in uphill going or if you just want to change gear rapidly.

When changing gear in a common way, using the lever at the bicycle handle bar, the invention makes it possible to accomplish a disengagement of the freewheel coupling in the drive wheel, which means that the chain transmission may be rotated in spite of the drive wheel being at standstill. The disengagement takes place simultaneously with or just before the gear changing. When going uphill, rapid downshifting of the gears has to be performed to keep up the speed of the bicycle. This is made easy by the device according to the invention.

ON THE DRAWINGS

Figure 1:
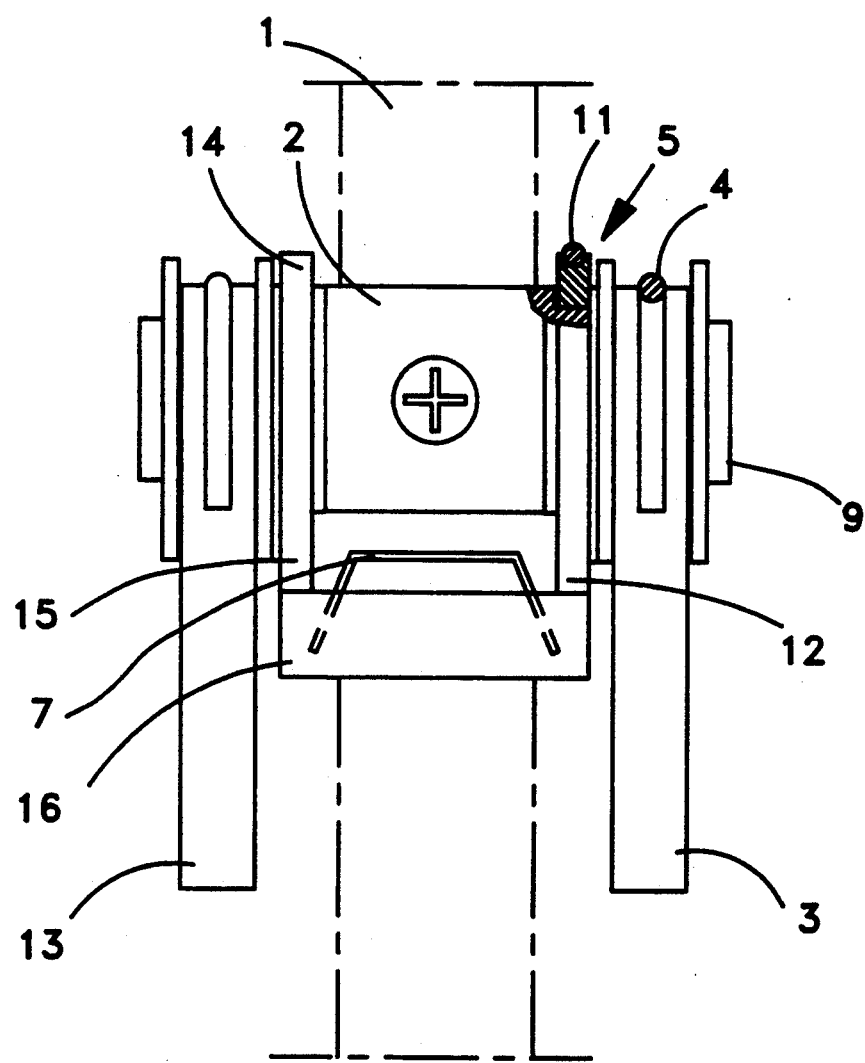
FIG. 1 shows a gear shifting device according to the invention
Figure 2:
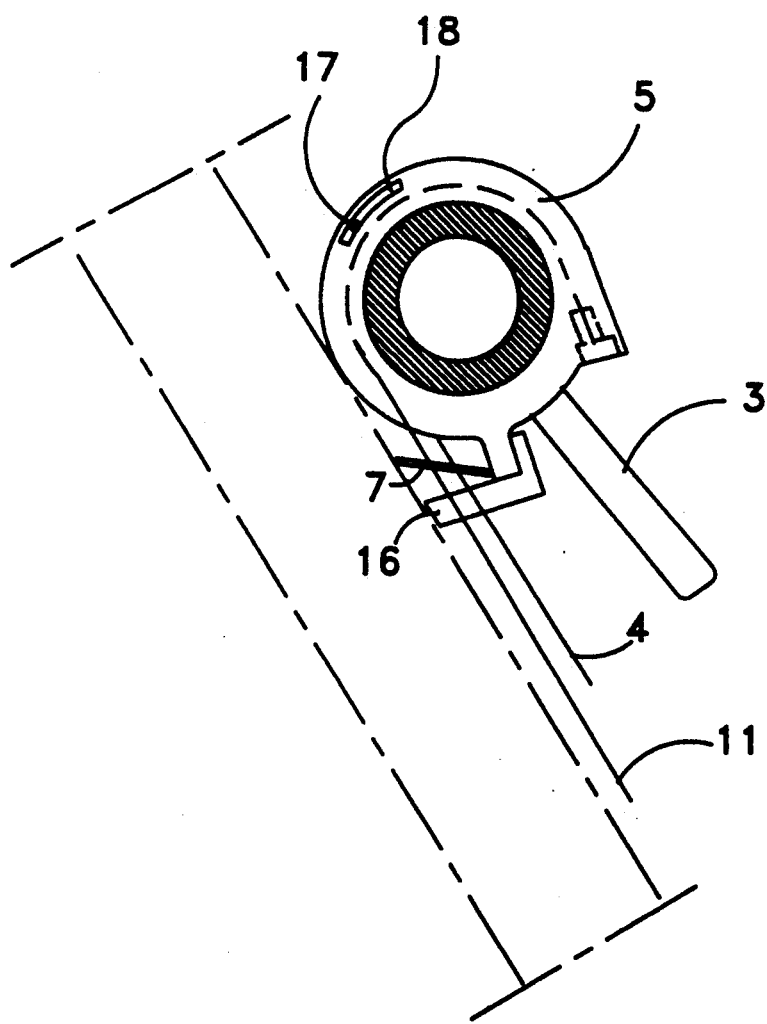
FIG. 2 shows a sideview of the device in FIG. 1

The device shown in FIGS. 1 and 2 comprises a housing 2 attached to a frame tube 1 by means of a screw or welding joint. An axle 9 is supported in the housing 2 and carries two gear shift levers 3 and 13. The lever 3 is coupled to a cable 4 for controlling the chain gear shift mechanism in the rear wheel. Between the housing 2 and the lever 3, there is provided a disengage means 5, which comprises a lever 12 and is connected to the freewheel coupling in the rear wheel by a cable 11. The lever 13 is in a common way connected by means of a cable to the chain gear change mechanism for altering the chain engagement between two or more chain sprockets on the pedal crank assembly of the bicycle. The ring 14 with the lever 15 are pivotally mounted on the axle 9 in a similar way as the disengage means 5 on the opposite side. A connection piece 16 is attached to and intercouples the levers 15 and 12. The connection piece limits the movement of the levers 15 and 12 by abutting against the frame tube 1. A pretensioned spring 7 is connected between the ends of the cable 11 and the device for disengagament of the freewheel coupling so as to limit the load on the freewheel catches, in particular if gear changing is to be performed when the bicycle is at rest.

Limitation of the disengage means 5 and 14 as regards movement in the opposite direction takes place by contact between the screw axle 17 and the frame tube. Openings 18 in the disengage means 5 and 14 for receiving the screw axle 17 inables adjustment of the movement.

At fast gear changing, the connection piece 16 is pressed down with the thumb such that the catches in the freewheel coupling in the drive wheel hub are disengaged. Thereupon, the shifting lever 3 is moved in one or the other direction depending on which gear is desired while rotating the pedal crank.

Figure 3:
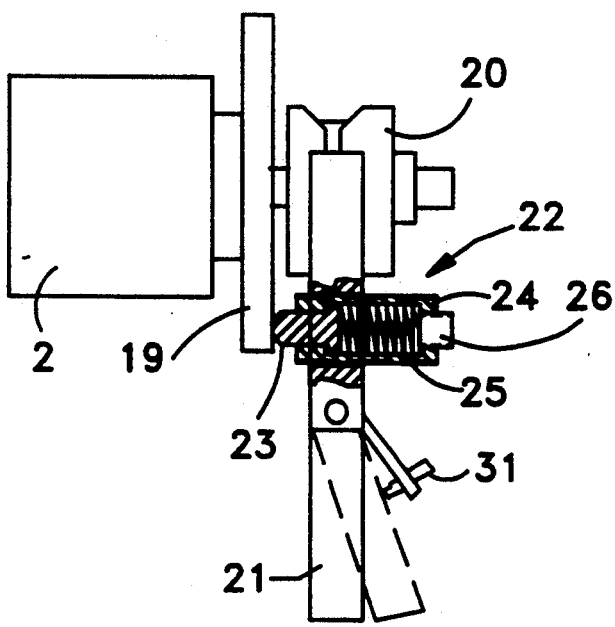
FIG. 3 shows an alternative gear shifting device according to the invention
Figure 4:
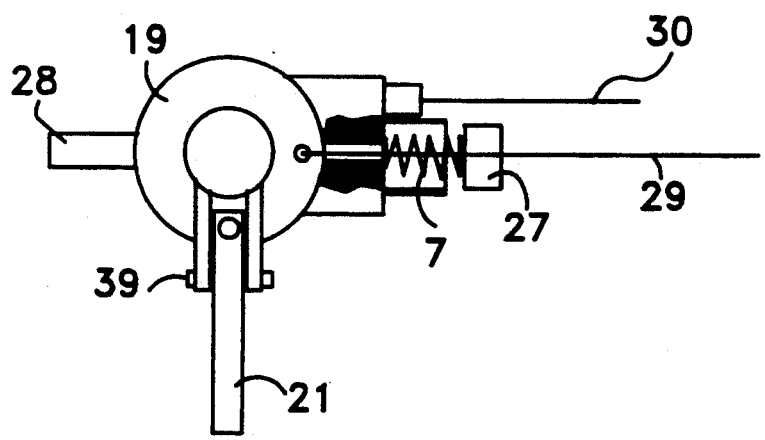
FIG. 4 shows a sideview of the device in FIG. 3

FIGS. 3 and 4 show another embodiment of the shifting means. This embodiment is basically similar to the above described apart from that the disengage means 5 in FIG. 1 is formed by a ring plate 19 which is journalled about a tubular axle 6. Moreover, the shifting means 20 comprises a lever 21 pivotally journalled on an axle 39. At the upper end of the lever 21, there is arranged a friction device 23 which comprises a friction plunge 23 mounted on a stub axle 24, a compression spring 25, and an adjusting screw 26.

Figure 6:
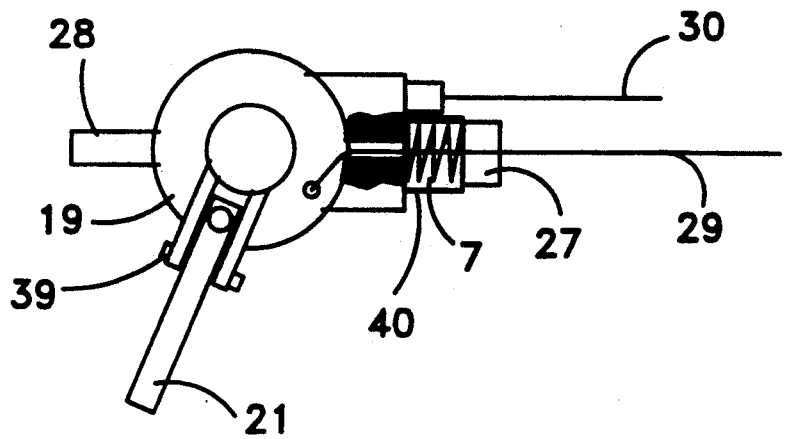
FIG. 6 shows the device in FIGS. 3 and 4 in engaged position

A cable 29 is connected to the annular plate 19, and on the cable 29, there is mounted an adjustable stop 27. A stub axle 28 is rigidly connected to the annular plates 19 by which the freewheel coupling is manually disengagable without performing a gear change movement. In the housing 2, there is mounted a guide means 40 for guiding the cables 29 and 30 connected to the chain gear mechanism in the drive wheel. When changing gear and you at the same time desire to disengage the freewheel coupling, you have to operate the pivot lever 21 such that the friction device 22 including the friction plunge 23 is brought into contact with the annular plate 19. Thereupon. the pivot lever 21 is rotated in one or the other direction depending on which gear is to be engaged. Since the annular plate 19 and the cable 29 need just a short way of movement to accomplish disengagement of the freewheel coupling, this will be the first thing to happen, and when the gear is to be shifted from, for instance the lowest to the highest gear, the annular plate 19 stops rotating after a completed disengagement movement, whereupon a slippling action takes place between the annular plate 19 and the friction plunge 23 at continued rotation of the lever 21. Moreover, an adjustable stop member 31 is arranged to facilitate setting of the friction generated torque at rotation of lever 21. In FIG. 6, there is shown the device according to FIGS. 3 and 4 in activated position in which the cable stop 27 has got into contact with the guide 40.

Figure 5:
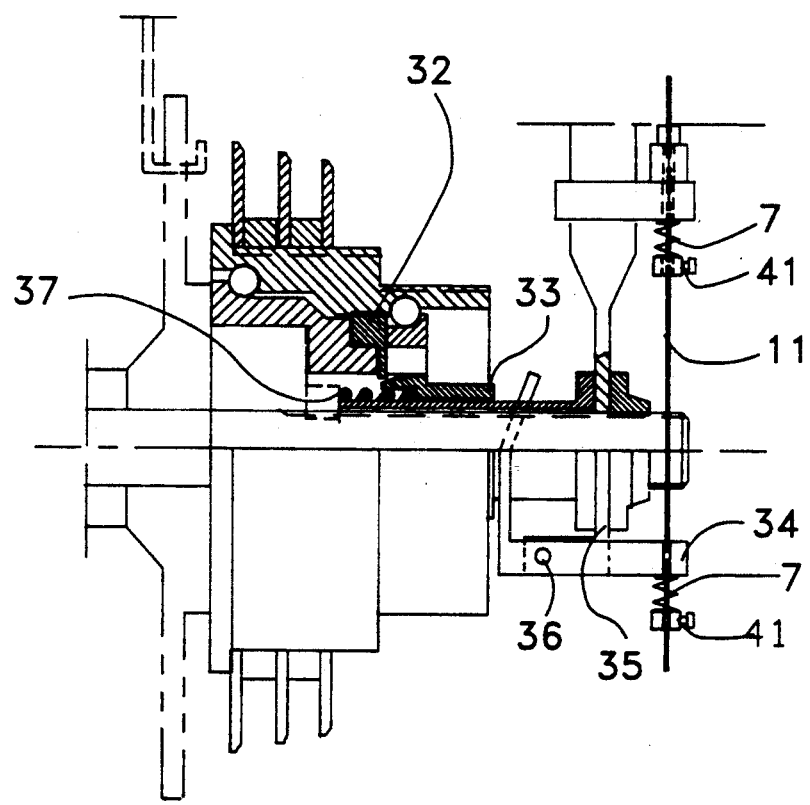
FIG. 5 shows a disengage mechanism in the drive wheel hub

FIG. 5 shows a disengagement device for releasing the catches 32 of a freewheel coupling in the wheel hub. The device comprises a lever 34 which is pivoted on a bracket 35 by means of a stub axle 36. The lever 34 is connected by its one end to the cable 11, and by its other end it is arranged to act upon a sleeve 33 which is conical in its one end.

A spring 37 acts against the sleeve 33 in direction towards the lever 34, and a spring 38 which surrounds the cable 11 acts between a stop 41 on the cable 11 and the lever 34.

As the cable 11 is pulled as described above in connection with FIGS. 1 and 2, the lever 34 is pivoted to thereby move the sleeve 33 axially. The catches 32 of the freewheel coupling are turned sidewise into released positions.

The spring 37 is arranged to return the sleeve 33 at completed gear change operation, and the spring 38 is active to pull back the cable 11 and also to protect the device against overload.

Figure 8:
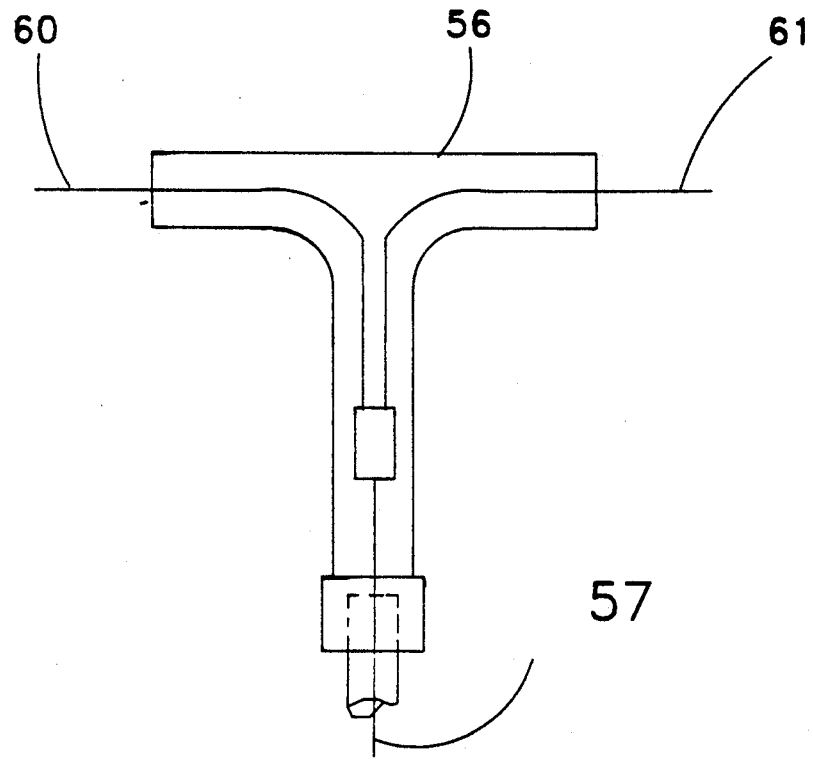
FIG. 8 shows an alternative arrangement of the wires for the device in FIG. 7.
Figure 7:
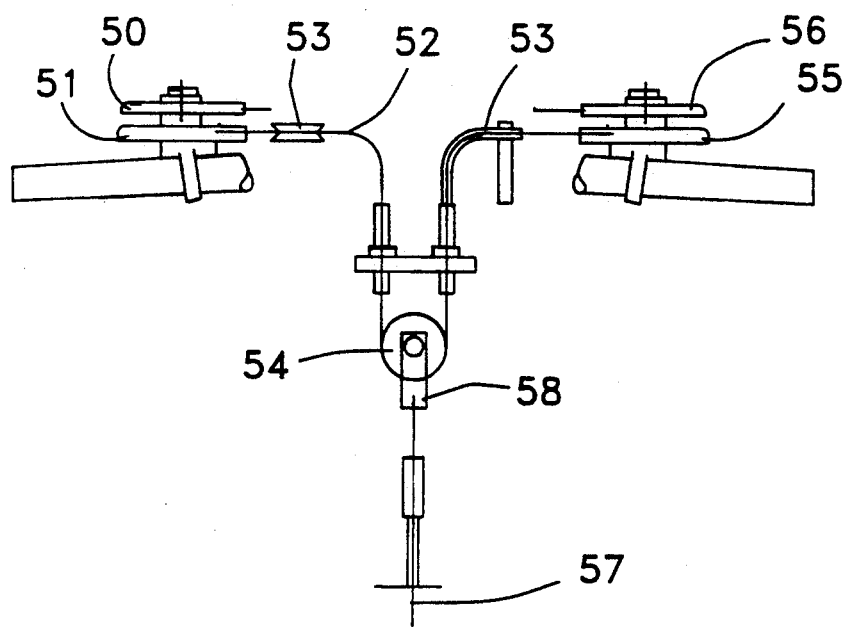
FIG. 7 shows an alternative location of the gear shift levers and shifting means

FIGS. 7 and 8 show two alternative cable arrangements comprising two separate gear levers 50 and 56 on the handle bar of the bicycle. Two disengage levers 51 and 55 are located beneath and in a coaxial disposition relative to the gear change levers 50 and 56. A cable 52 is coupled to the disengage lever 51 and extends through a sleeve 53 and over a pully 54 to the other disengage lever 55. A second cable 57 is connected to a yoke 58 on which the pully 54 is journalled. The cable 57 extends further through a sleeve to the disengage lever for releasing the catches n the freewheel coupling in the rear wheel hub.

FIG. 8 shows a bracket 59 on which the cables 60 and 61 run from the two disengage levers 51 and 55. The cables 60 and 61 are united to one single cable 57 which is connected to the releasing device for the freewheel coupling.

When changing gear by operating the lever 50, it is easy to let the finger or thumb also activate the disengage lever 51 such that release of the freewheel coupling takes place simultaneously with the gear change operation. In this case, the thumb or finger will itself act as a friction means acting against the disengage lever 51 when the latter needs a shorter activation distance.

The embodiments are not limited to the above described examples, but may vary within the scope of the invention. The disengage means for instance may be located on top of the shifting device or be arranged to be activated by pressing a knob in the centre of the shifting device.

I claim:

1. Device for bicycles, comprising a drive mechanism which is coupled to a drive wheel of a bicycle and includes a gear change mechanism with a number of different size chain sprockets, a shifting means coupled to said gear change mechanism, and a free wheel coupling arranged between the drive wheel and said chain sprockets, characterized in that a disengage means (34-37) is coupled to said free wheel coupling (32) for disengaging the latter, thereby enabling shifting of said gear change mechanism during free rotation of said drive mechanism in the driving direction.

2. Device according to claim 1, wherein said shifting means (20) and said disengage means (34-37) are associated with each other in a common maneuver means (21), said maneuver means (21) is operable in two different directions.

3. Device according to claim 1, wherein said disengage means (34-37) is coupled to a friction element (19) which is associated with said shifting means (20) and movable in parallel thereto, a manually operable drive means (23) arranged to cooperate with said friction element (19) for enabling a smooth gear shifting and disengagement.

4. Device according to claim 3, wherein said maneuver means (21) comprises a lever (21) which is pivoted on one hand about a first axis (2) for accomplishing gear shifting and disengagement movements and on the other hand about a second axis (24) for activating said drive means (23) in and out of engagement, respectively, with said friction element (19).

5. Device according to claim 1, wherein a spring means (37) is arranged to make said free wheel coupling reengage after disengagement.

* * * * *